(12) United States Patent
Pandian

(10) Patent No.: US 10,393,153 B2
(45) Date of Patent: Aug. 27, 2019

(54) ACTUATOR MECHANISM

(71) Applicant: Goodrich Aerospace Services Private Limited, Hobli, Bangalore, Karnataka (IN)

(72) Inventor: Navaneethakrishnan Pandian, Bangalore (IN)

(73) Assignee: GOODRICH AEROSPACE SERVICES PRIVATE LIMITED, Bangalore, Karnataka (IN)

( * ) Notice: Subject to any disclaimer, the term of this patent is extended or adjusted under 35 U.S.C. 154(b) by 91 days.

(21) Appl. No.: 15/444,834

(22) Filed: Feb. 28, 2017

(65) Prior Publication Data
US 2017/0321731 A1   Nov. 9, 2017

(30) Foreign Application Priority Data

May 6, 2016   (IN) .............................. 201641015939

(51) Int. Cl.
*F15B 15/26*   (2006.01)
*B64D 29/06*   (2006.01)

(52) U.S. Cl.
CPC ............ *F15B 15/261* (2013.01); *B64D 29/06* (2013.01)

(58) Field of Classification Search
CPC ................................................... F15B 15/261
See application file for complete search history.

(56) References Cited

U.S. PATENT DOCUMENTS

| 3,799,036 | A  | * | 3/1974  | Slaughter ............... | F15B 15/261 |
|           |    |   |         |                          | 188/110 |
| 8,191,440 | B2 | * | 6/2012  | Hadley .................... | B64C 25/24 |
|           |    |   |         |                          | 74/89.34 |
| 9,140,048 | B2 | * | 9/2015  | Langford ................ | E05F 15/53 |
| 9,631,412 | B2 | * | 4/2017  | Hellwig .................. | E05F 3/104 |
| 2012/0312154 | A1 | * | 12/2012 | Langford ................ | E05F 15/53 |
|           |    |   |         |                          | 91/41 |
| 2016/0245387 | A1 | * | 8/2016  | Pandian ................. | B64D 29/06 |

FOREIGN PATENT DOCUMENTS

EP    2532821 A2   12/2012

* cited by examiner

*Primary Examiner* — Thomas E Lazo
(74) *Attorney, Agent, or Firm* — Cantor Colburn LLP

(57) ABSTRACT

An actuator system comprising a rotatable lock mechanism defining a path for an actuator pin as the actuator is expanded and retracted, wherein the lock mechanism defines an entry passage through which the pin enters as the actuator extends, a guide surface along which the pin travels from the entry passage as the actuator retracts, a locking recess into which the pin is guided by the guide surface, and an exit passage into which the pin is guided as it is caused to leave the lock recess by extension of the actuator and subsequent retraction; whereby a detent surface is provided to prevent the pin returning back into the lock recess when the actuator is extended to cause the pin to leave the lock recess.

4 Claims, 17 Drawing Sheets

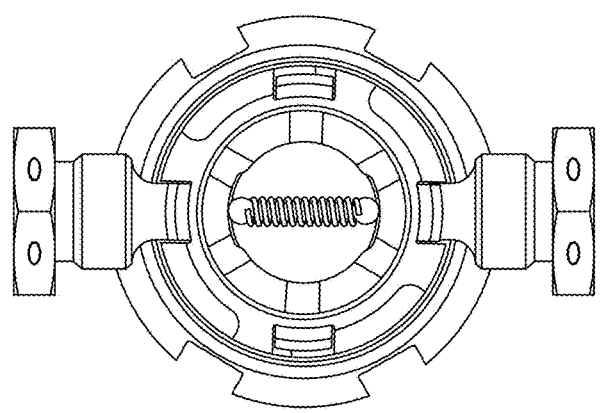
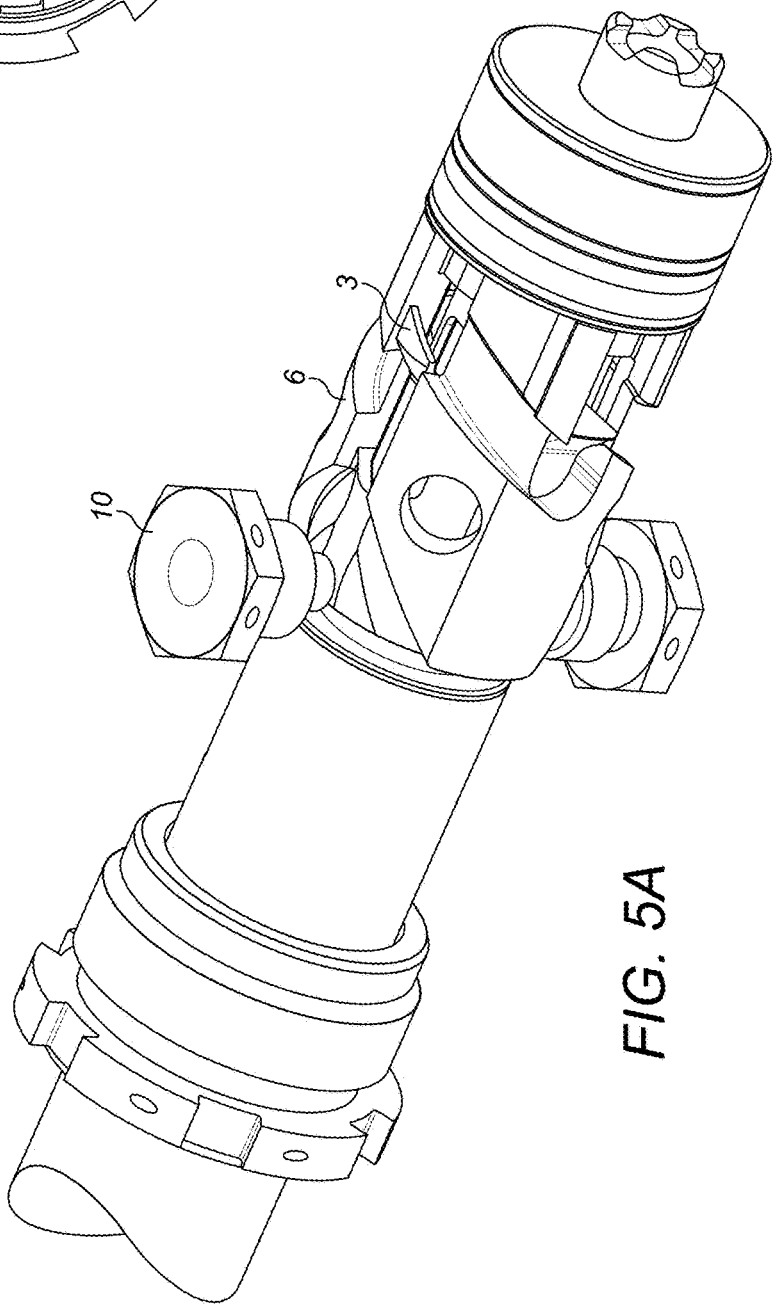

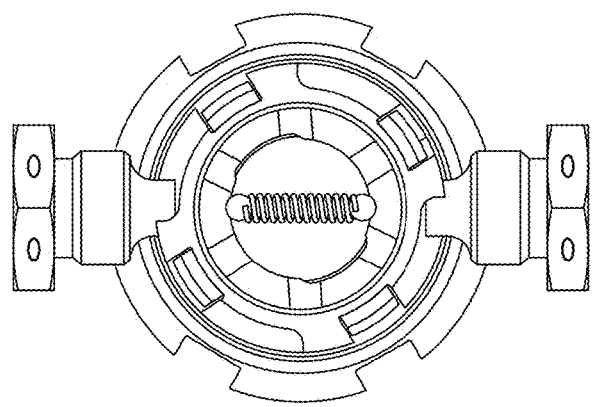
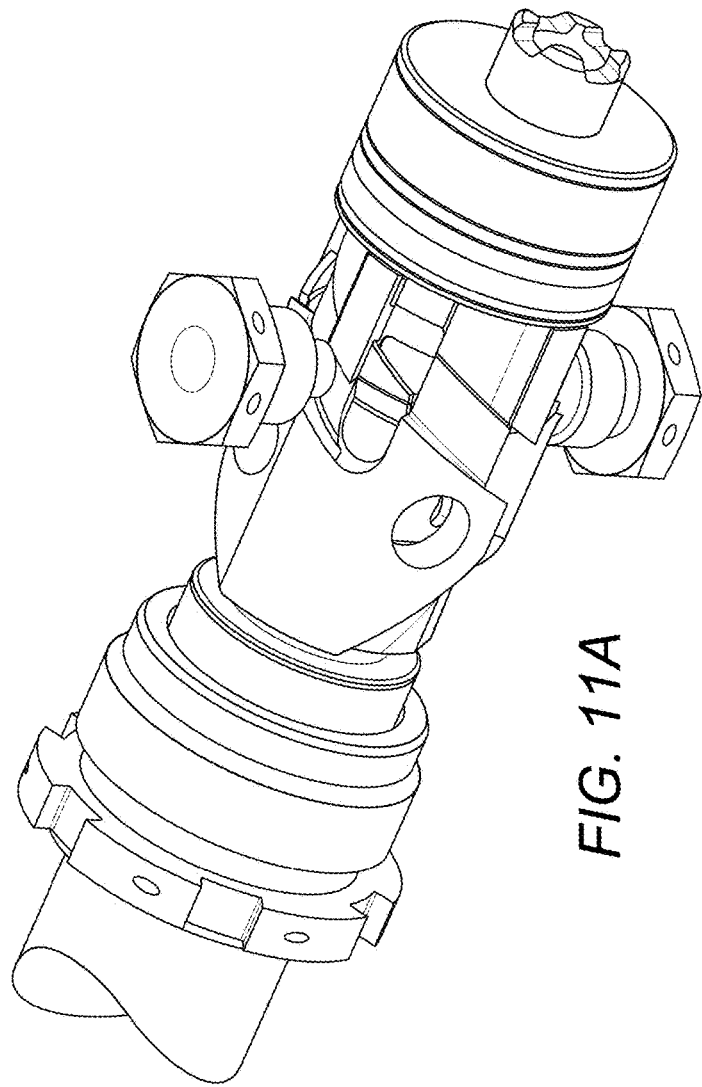
FIG. 11B
FIG. 11A

ACTUATOR MECHANISM

FOREIGN PRIORITY

This application claims priority to Indian Patent Application No. 201641015939 filed May 6, 2016, the entire contents of which is incorporated herein by reference.

TECHNICAL FIELD

The present disclosure relates to an actuator mechanism moveable between a locked and an unlocked position. The mechanism is particularly, but not exclusively, for use in aircraft engines, and finds particular application in opening and closing aircraft engine cowls.

Aircraft engine cowls such as those covering the C-duct and fans need to be opened occasionally to allow access to the engine for e.g. repair and maintenance, and then closed again. Actuators are provided to open and close the cowls. Preferably no pressure or driving force should be required to keep the actuator in the open position, despite the weight of the cowl door.

BACKGROUND

Conventionally, hydraulic or pneumatic actuators are used, although other types of actuator, e.g. electrical or mechanical, may also be used. The actuators generally comprise an extendible rod or arm that is attached to open the cowl as it extends and close the cowl as it retracts under the weight of the cowl door.

A typical hydraulic actuator comprises a piston rod, a cylinder and a rotatable lock mechanism to facilitate mechanical operation of the cowl door or flap. Pressure is applied to fully extend the actuator; when fully extended, pressure is removed allowing the actuator to retract by a small amount which causes the actuator to lock, as the lock mechanism rotates and engages the actuator. To close, or stow, the cowl door, the actuator is then extended by application of pressure out of the locked position to its fully extended position from which, as pressure is removed, the actuator is able to return to a retracted, stowed, position.

A rotatable lock mechanism, in cooperation with a lock pin, provides the paths for the actuator to take up its locked position or return to its stowed position, as will be described further below.

Whilst such an arrangement permits locking of the actuator in an extended position, and so does not require the associated hydraulic pump to be operating throughout the period of time that the associated door or doors are to be held in their open positions, there is a risk that if the actuator has not fully extended before being retracted by a small amount to take up the locked state, the actuator may come to rest in an intermediate position and appear to be locked in its extended position without the locking mechanism being properly engaged. In such circumstances, after the hydraulic pressure has been removed, jarring or vibrations could result in disengagement of the lock arrangement and the actuator being unable to hold the door(s) in the open position. Clearly, this is undesirable.

EP 2532821 describes an improved actuator mechanism that avoids the actuator stopping in such an intermediate position. EP 2532821 provides a resilient detent in the paths for a locking pin provided by the lock mechanism such that once the locking pin has moved beyond a predetermined position in the extending direction the resilient detent prevents return movement of the pin along the entry path.

A further problem has been identified with the known actuator mechanism when the actuator is used to return the cowl to the stowed state. Here, as mentioned above, the actuator is extended (out of the locked state) and then, due to the paths defined by the lock mechanism, returns to the retracted state, via an exit path. If, however, the actuator is not fully or sufficiently extended to clear the path for the locked state, the pin can again become stuck in position at an intermediate point, rather than automatically feed into and follow the exit path under the weight of the cowl. This intermediate position can be falsely interpreted as a locked state. If the actuator is jolted or slightly disturbed, the locking pin can slip from the intermediate point, back into the locked position, which can damage the door as well as damage other parts or cause injury.

Systems such as described in EP '821 include a feature that prevents this problem to some extent. A spring biased detent ball retainer (described further below) ensures that before the actuator locks onto such an intermediate point, the detent ball which is timed to run over a cam-like profile, rotates the collar lock so that the lock pin either moves into the locked state or the unlocked state.

Reliance of the lock mechanism on the torque generated by the spring biased detent ball, however, limits the degrees of angular deviation at which the actuator can operate. Torque generated by the spring biased detent ball shall always be greater than the varying resistive torque. The torque generated is highly sensitive to the cam-like profile that the detent ball traces. The resistive torque depends upon factors such as thickness of the thin fluid film between the piston and lock collar (clearance), viscous drag on surfaces of rotating components, viscosity of working fluid which is, in turn, a function of ambient temperature.

The present disclosure therefore aims to provide an actuator locking mechanism that can prevent the actuator becoming stuck in an intermediate position when intended to be moved from the locked position to the stowed position, without reliance on a spring biased detent ball.

The present disclosure provides an actuator system comprising a rotatable lock mechanism defining a path for an actuator pin as the actuator is expanded and retracted, wherein the lock mechanism defines an entry passage through which the pin enters as the actuator extends, a guide surface along which the pin travels from the entry passage as the actuator retracts, a locking recess into which the pin is guided by the guide surface, and an exit passage into which the pin is guided as it is caused to leave the lock recess by extension of the actuator and subsequent retraction; whereby a detent surface is provided to prevent the pin returning back into the lock recess when the actuator is extended to cause the pin to leave the lock recess, wherein the lock mechanism comprises a collar defining the path and a tine gate fitted within the collar and comprising a detent finger defining the detent.

In some embodiments, the guide surface and/or the detent surface provide a slope.

A detent surface may also be provided in the entry passage.

The lock mechanism of the second aspect may provide advantages alone or in combination with the detent of the first aspect.

The rotatable lock mechanism comprises an interlocking collar and gate ring combination whereby the detents are provided on a gate ring that is nested under the collar.

A spring biased detent ball arrangement may be provided across the inner surface of the lock mechanism.

Preferred embodiments of the invention will now be described by way of example only, and with reference to the drawings.

BRIEF DESCRIPTION OF THE DRAWINGS

FIG. 5A shows the locking mechanism at the start of the locking procedure.

FIG. 5B shows the detent ball mechanism in cross section at the point shown in FIG. 5A.

FIGS. 11a and 11b show how the various components move relative to each other during a known locking and unlocking procedure.

DETAILED DESCRIPTION

An existing actuator system will now be described with reference to the drawings.

Figure 1:
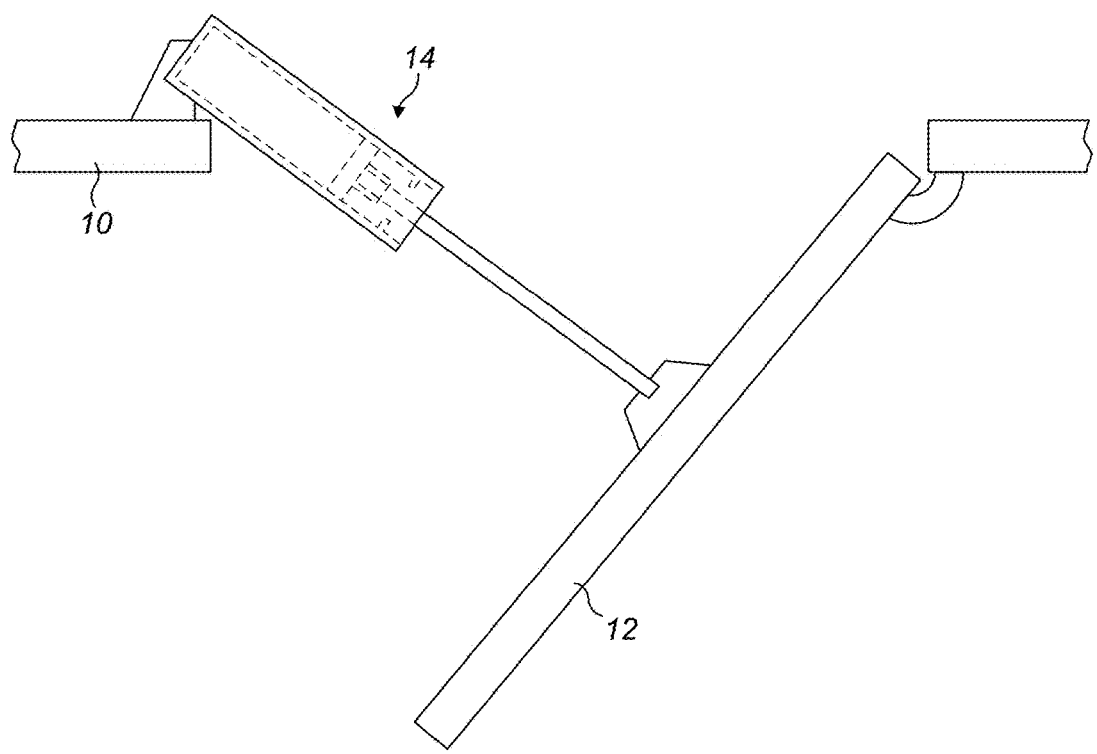
FIG. 1 shows an actuator according to an embodiment of the disclosure, in use.

FIG. 1 shows an actuator according to an embodiment of the invention, in use. FIG. 1 shows part of an engine housing 10 including a door 12 moveable between a closed, in use position, and an open position. In FIG. 1, the door 12 is shown in its open position. An actuator 14 is arranged to drive the door between the two positions. In the example shown, the actuator is in the form of a hydraulic piston or ram comprising a housing cylinder within which a piston is slidable. The cylinder is mounted to the engine housing 10, by means of an eye end (shown in FIG. 2), while the door is connected to an end of the piston rod, again via an eye end. By controlling the pressure of fluid applied to a chamber within the actuator, extension and retraction of the actuator can be controlled so as to drive the door between its closed and opened positions. Other types of actuators may be used, including electrically or mechanically driven actuators.

Figure 2:
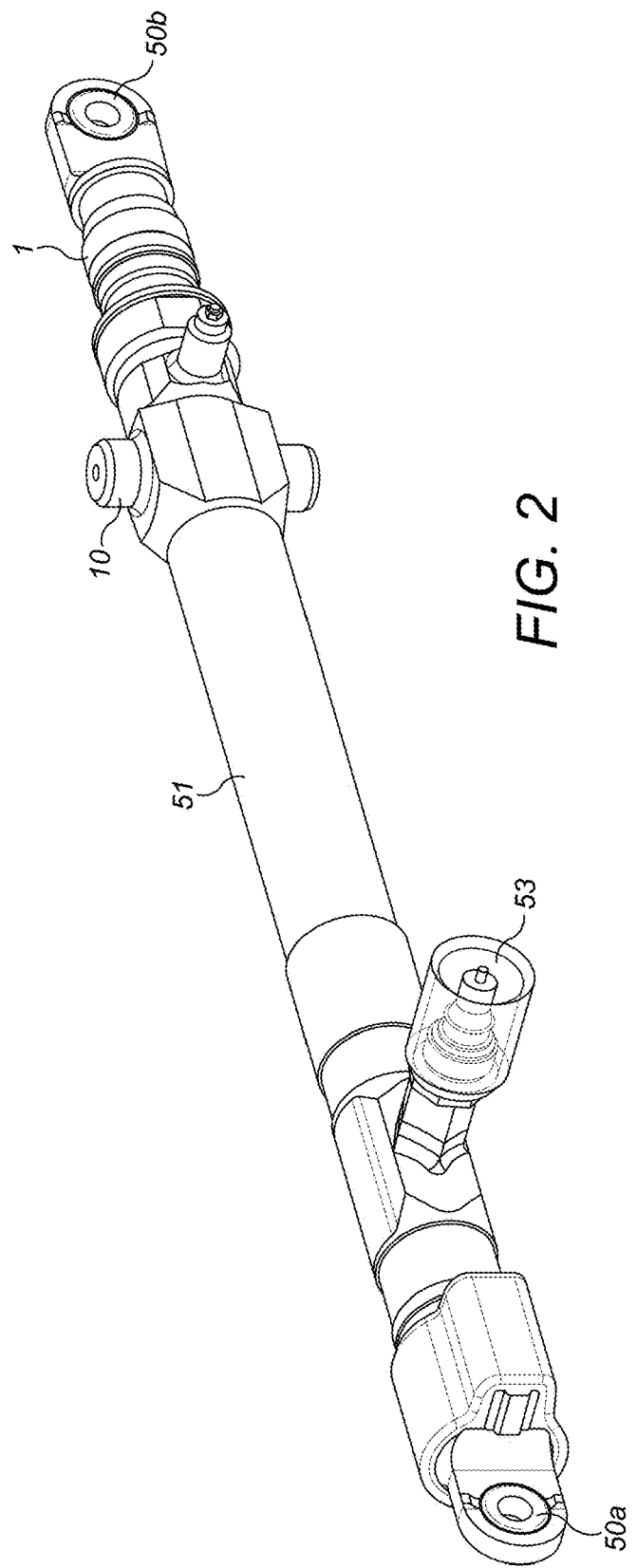
FIG. 2 shows a perspective view of an actuator according to the disclosure.
Figure 3:
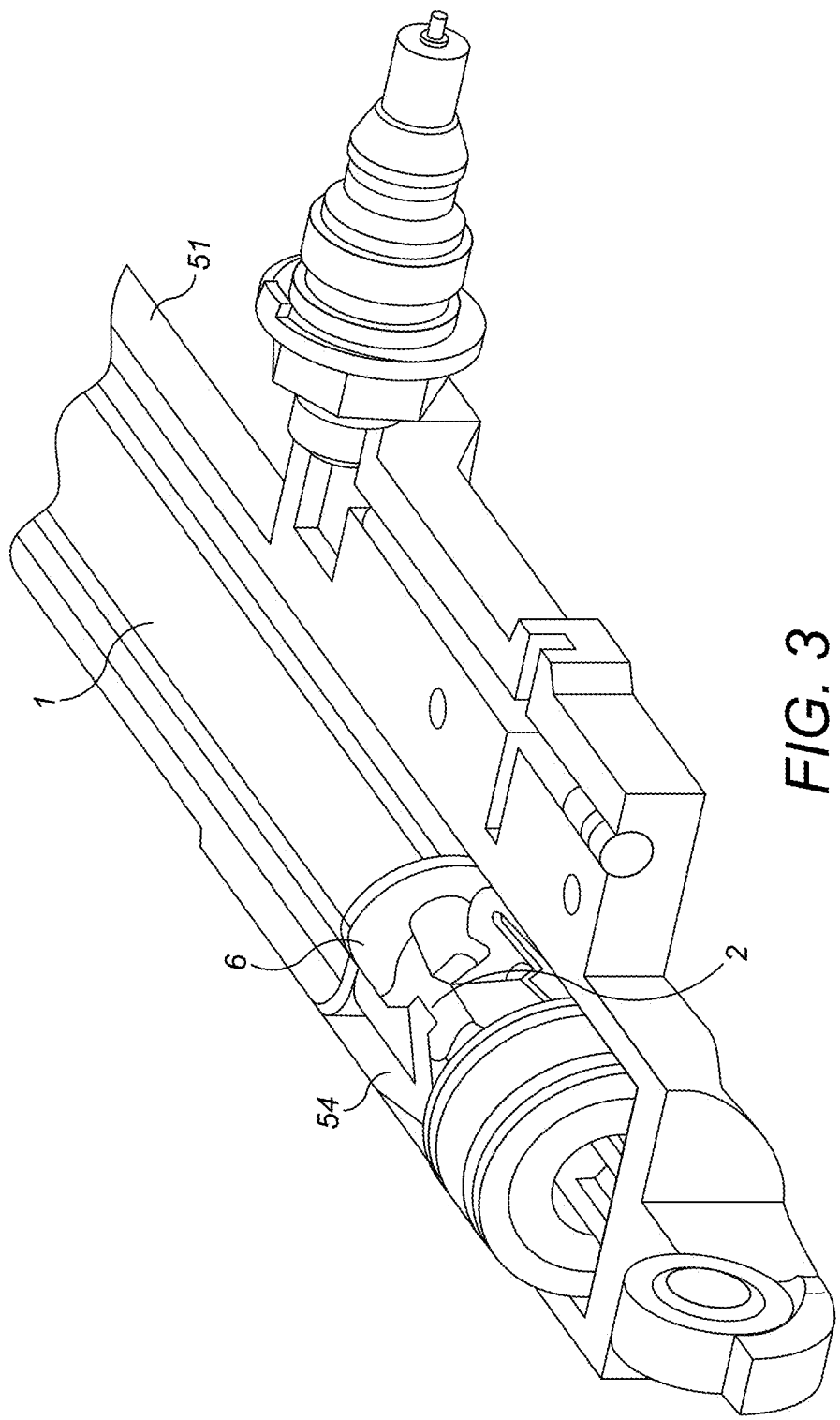
FIG. 3 is a cut-away view of one end of the actuator of FIG. 2, with the cylinder removed to aid description.

As shown in more detail in FIGS. 2 and 3, the actuator comprises an eye 50a, 50b at each end for attachment, respectively, to the engine and to the door to be opened and closed. A cylinder 51 runs between the ends within which an piston rod is axially slidably mounted. A port 53 is provided through the cylinder close to one end, through which fluid can be provided to hydraulically move the piston rod within/along the cylinder. A rotating lock mechanism 54 is provided at an end of the piston (the end closest to the port when the piston is retracted within the cylinder). The lock mechanism is fixed to move axially with the piston rod and is rotatable within the cylinder. One or more locking pins 10 are mounted on and extend through the cylinder wall at a location between the fluid port and the opposite end of the cylinder. As pressure is applied to the piston rod via the fluid port, the rod, together with the lock mechanism, moves axially away from the port, extending the actuator rod and moving the lock mechanism towards the pin(s).

The lock mechanism defines a path for the locking pin(s) including an entry passage, a locking recess, and an exit passage.

The lock mechanism comprises a collar lock comprising a collar having the path defined in its outer surface and, preferably, grooves in e.g. a helical formation on its inner surface. A spring biased detent ball arrangement 8 is biased across the inner bore of the collar such that a spring biases balls to run in and out of the grooves in the inner surface. The lock mechanism also comprises guide surfaces to direct the pins along appropriate paths, and detent means, as described above. These are provided on one or more gates or rings, known as a tine gate, that cooperate with and are nested within the collar. The nested arrangement of the tine gate within the collar lock reinforces or strengthens the detent finger part of the tine gate to protect it against breakage. The pins ride over the detent finger several times causing it to deflect and this repeated deflection could cause the detent finger to break. The nested arrangement prevents or minimises this.

Figure 4:
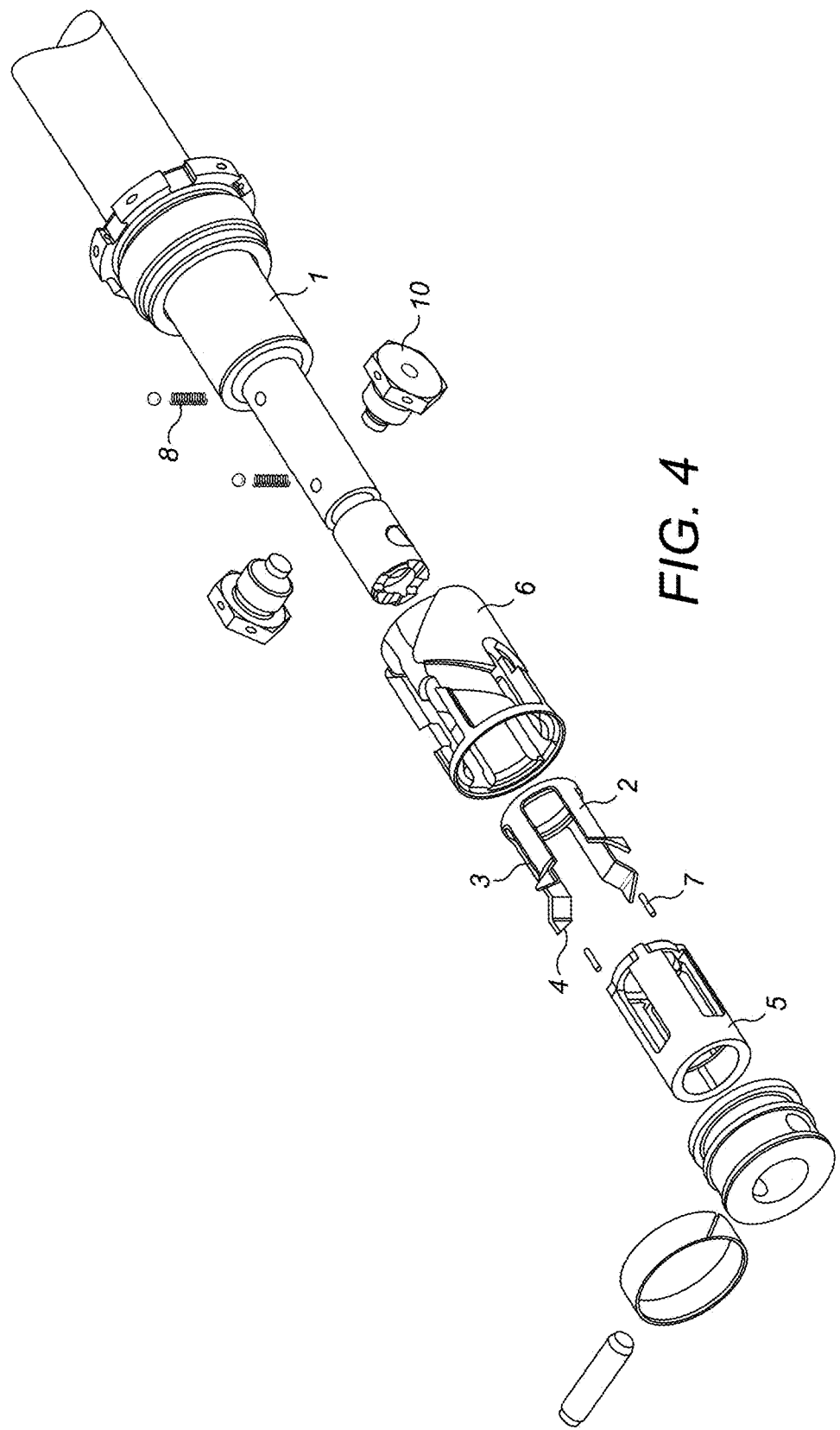
FIG. 4 is an exploded view of an example of the mechanism.

As shown in FIG. 4, the preferred lock mechanism is mounted about a piston rod 1. A tine gate 2 comprising detent fingers 3 defining detent surfaces 4 is held or nested between a sleeve 5 and a lock collar 6. The sleeve 5, tine gate 2 and lock collar 6 can be held together by e.g. dowel pins 7. The internal diameter of the sleeve has an indexed surface which supports spring biased detent balls 8. The spring biased detent balls orient the lock mechanism with respect to the lock pins 10. The tine gate 2 provides a resilient detent at the exit of the passage leading to the lock recess. This detent deflects down as the pin rides over it as the actuator extends to release the lock and, due to its resilience, springs up to form a detent once the pin has passed over it. Thus, even if the actuator is not fully extended, the pin is prevented from returning to the lock recess. The detent is preferably also formed with a sloping surface or ramp such that as the pin passes over the detent, and pressure is removed, the pin rides along this ramp to cause rotation of the collar lock and guide the pin into the exit passageway from which it exits the lock collar to retract the actuator.

Figure 6B:
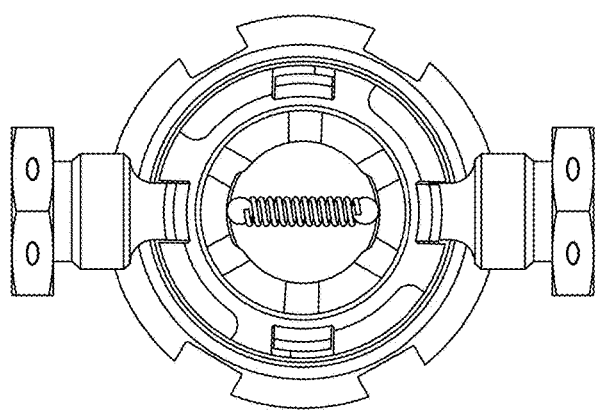
FIGS. 6a and 6b show how the various components move relative to each other during a known locking and unlocking procedure.
Figure 6A:
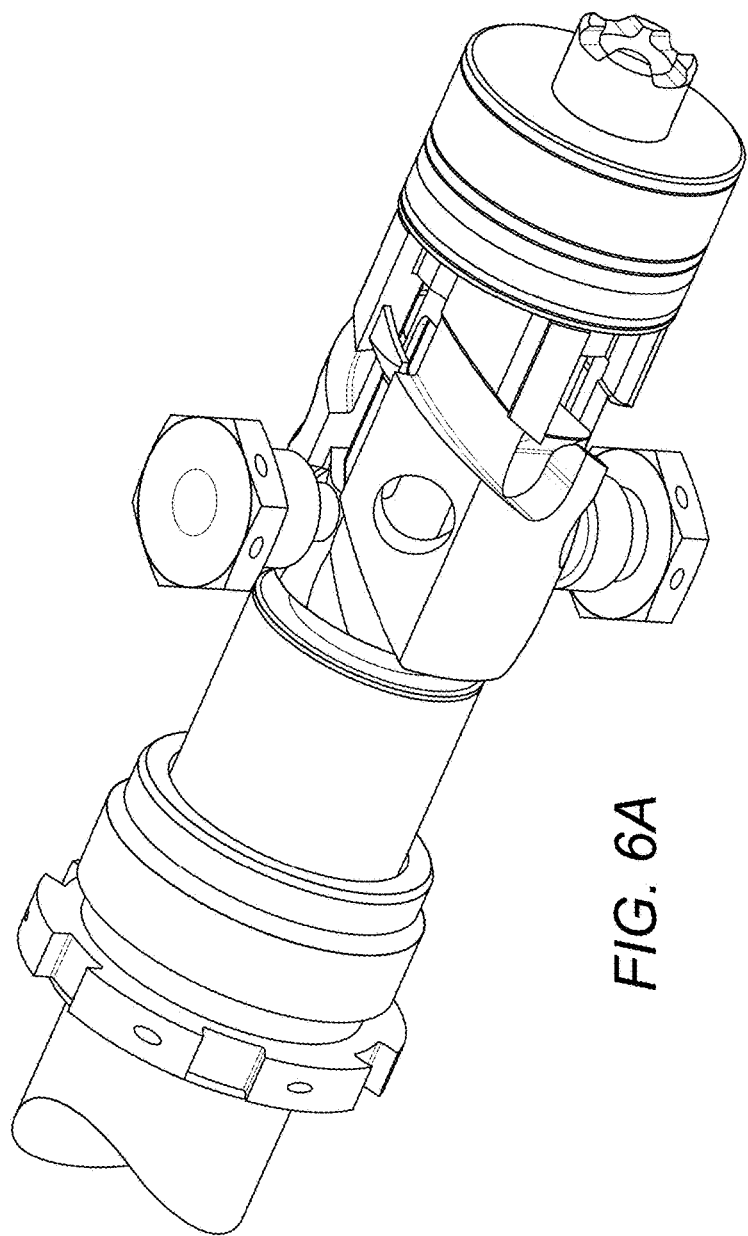
Figure 7B:
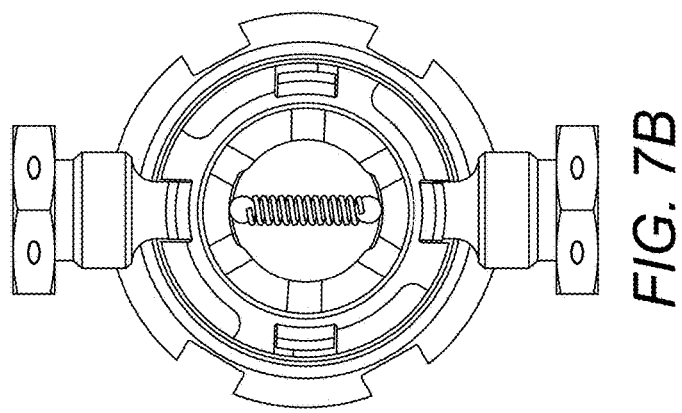
FIGS. 7a and 7b show how the various components move relative to each other during a known locking and unlocking procedure.
Figure 7A:
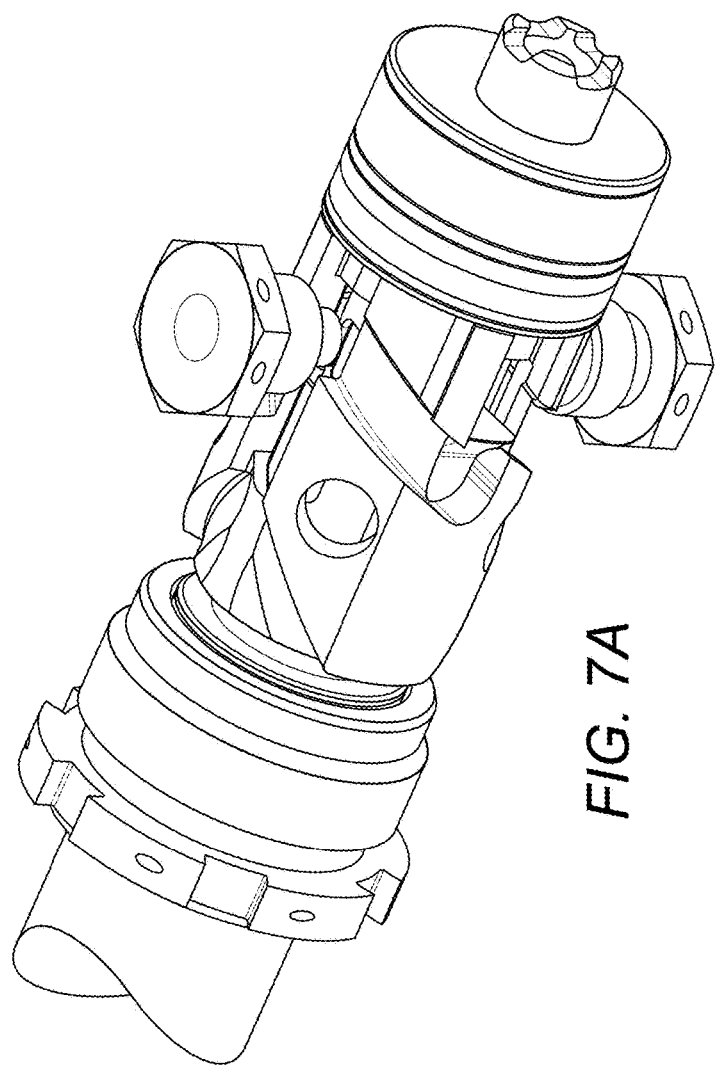
Figure 8B:
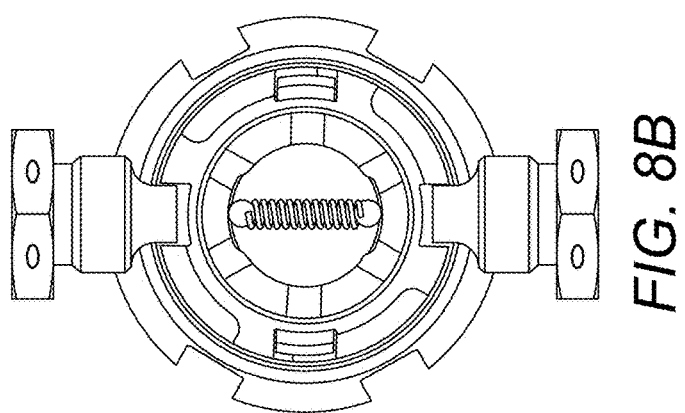
FIGS. 8a and 8b show how the various components move relative to each other during a known locking and unlocking procedure.
Figure 8A:
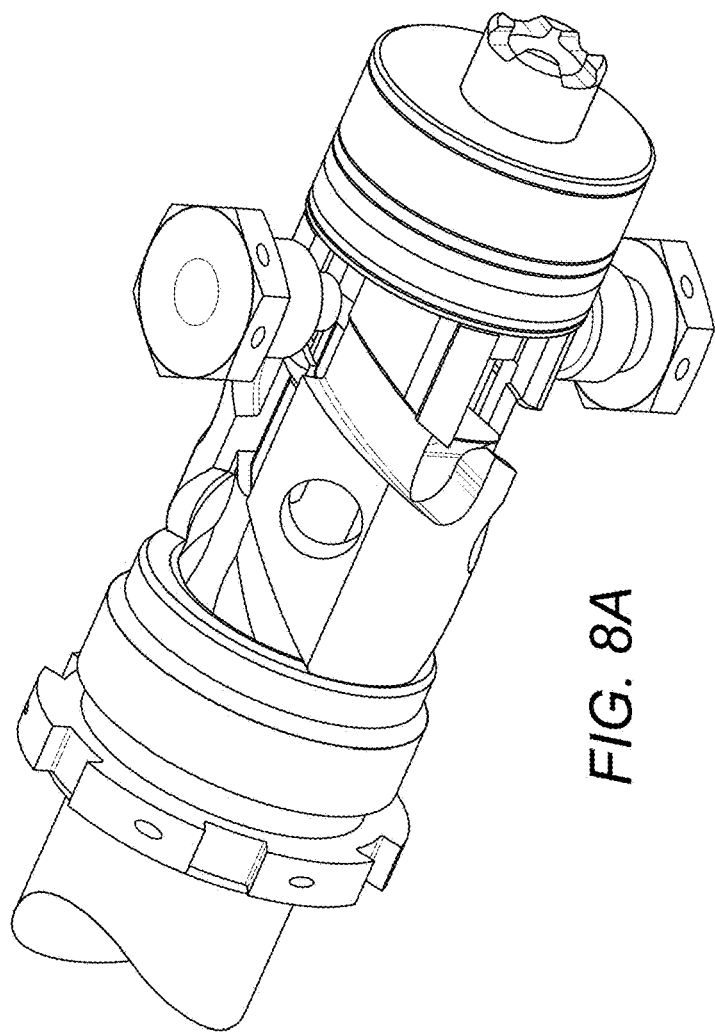
Figure 9B:
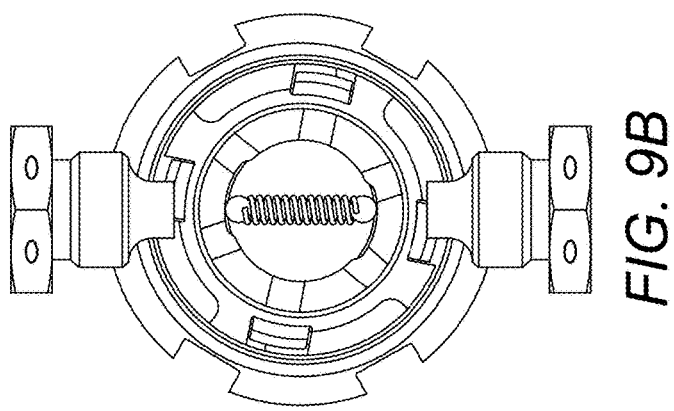
FIGS. 9a and 9b show how the various components move relative to each other during a known locking and unlocking procedure.
Figure 9A:
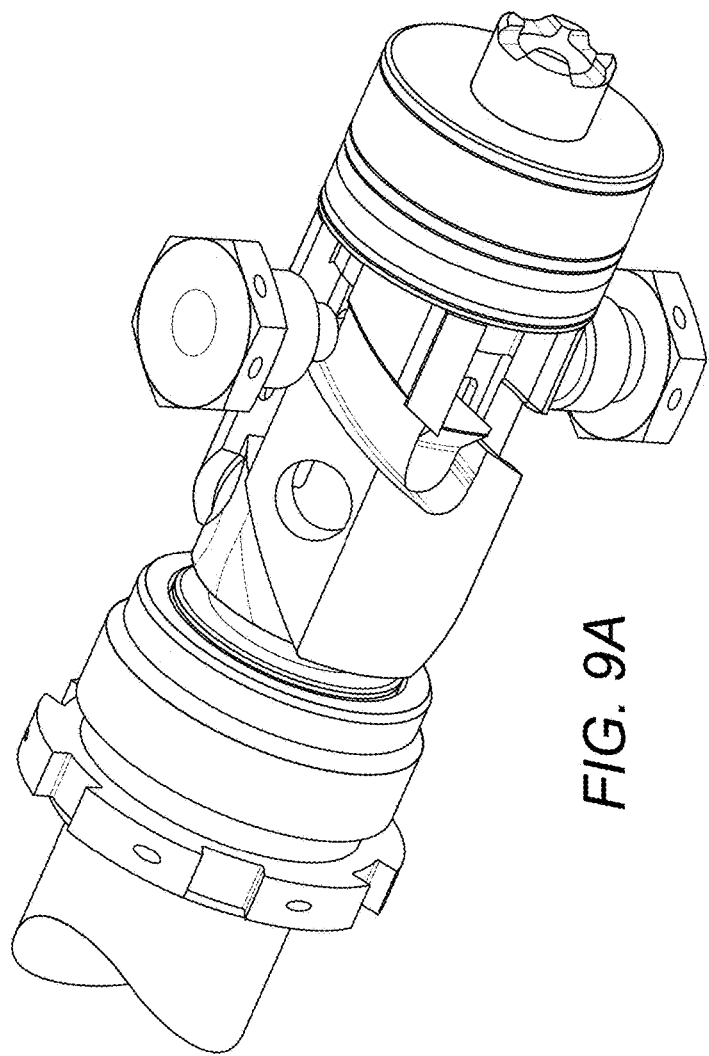
Figure 10B:
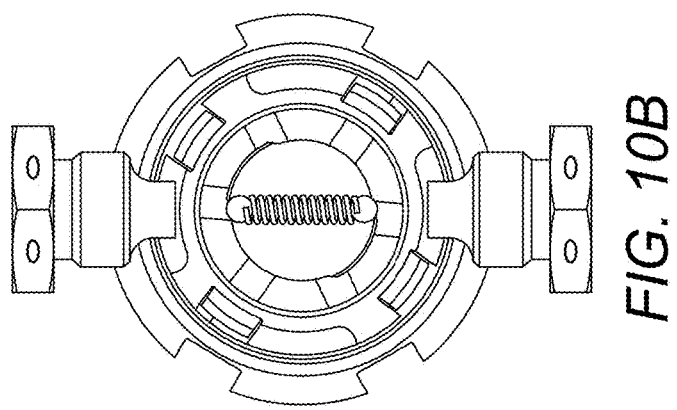
FIGS. 10a and 10b show how the various components move relative to each other during a known locking and unlocking procedure.
Figure 10A:
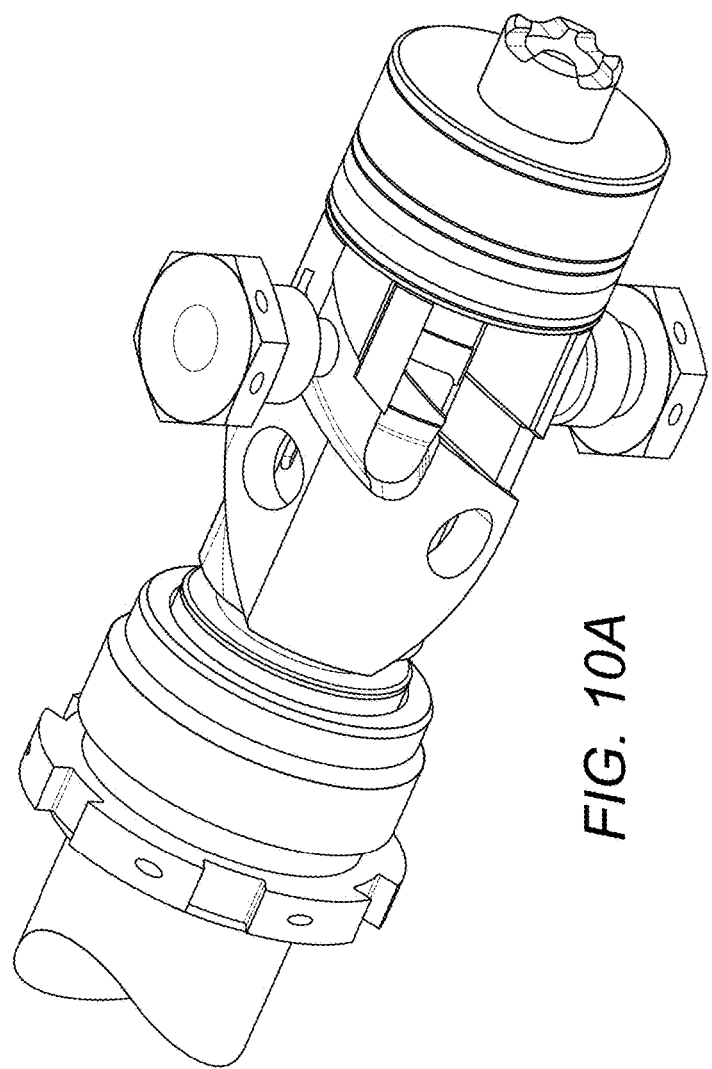
Figure 12B:
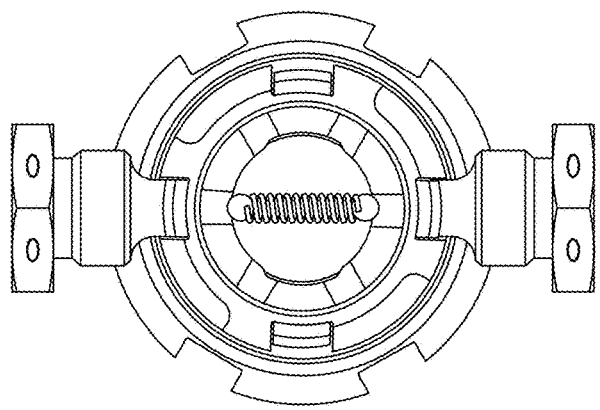
FIGS. 12a and 12b show how the various components move relative to each other during a known locking and unlocking procedure.
Figure 12A:
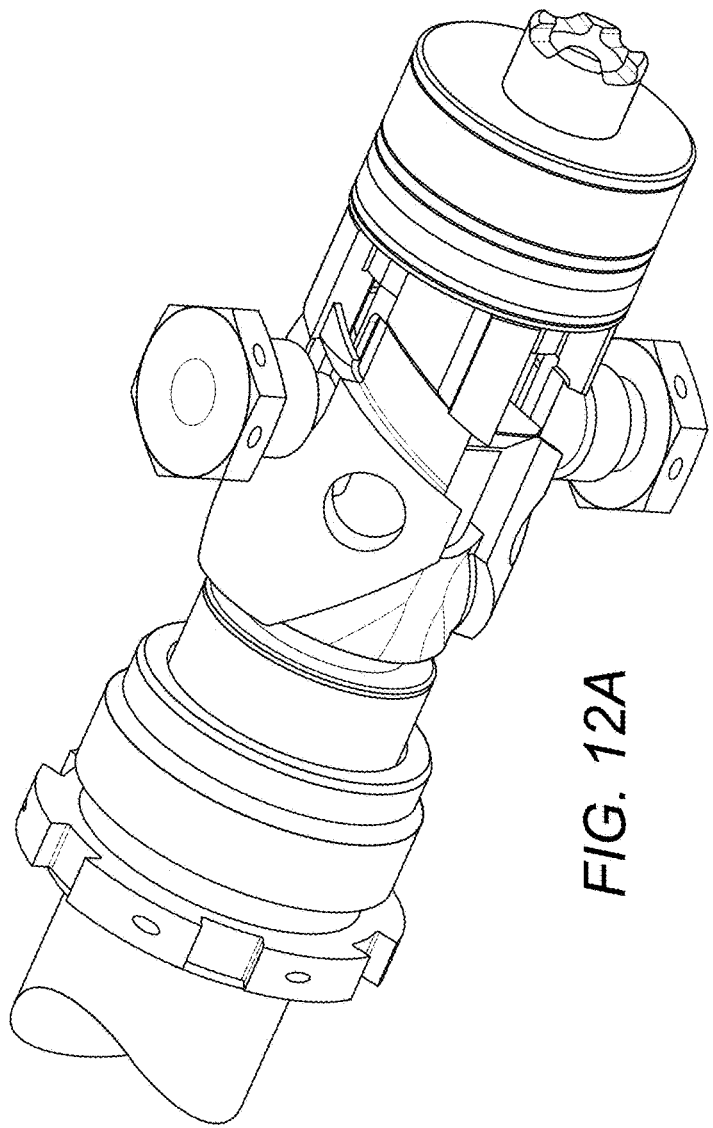
Figure 13B:
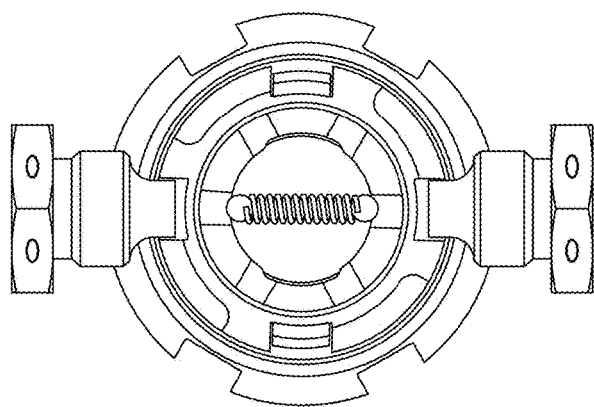
FIGS. 13a and 13b show how the various components move relative to each other during a known locking and unlocking procedure.
Figure 13A:
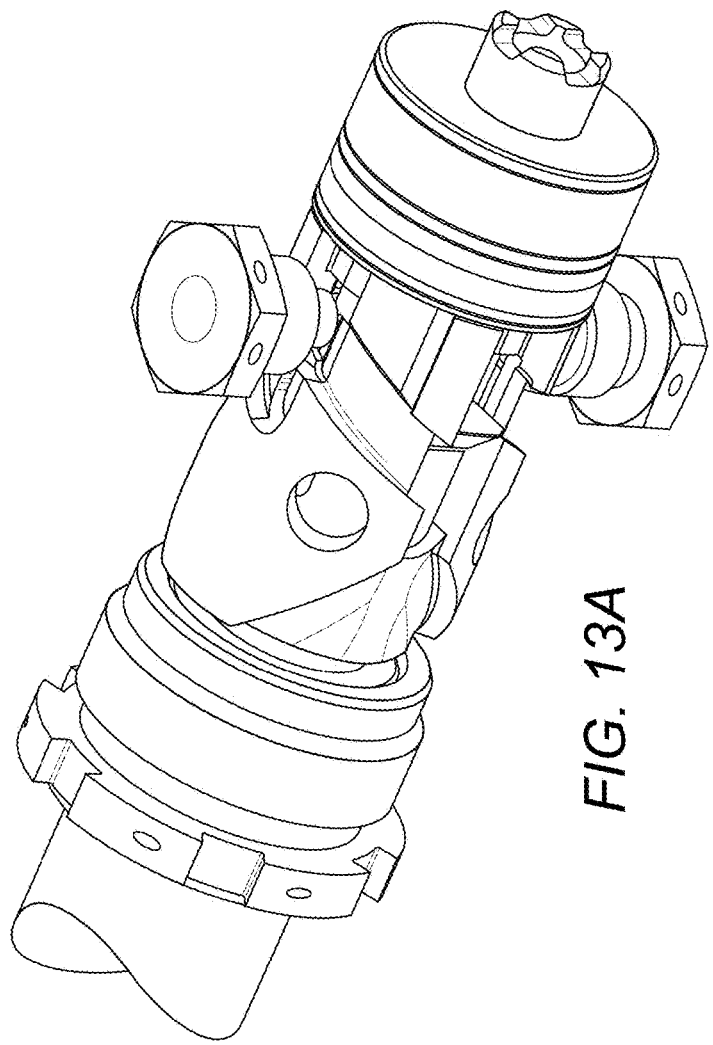

As can be seen in FIGS. 5 to 17, as the actuator extends, the lock mechanism engages the pin(s) in the cylinder, such that a pin enters an entry passage of the collar lock (FIGS. 5A, 5B). As the actuator continues to extend, the pin moves into the entry passage (FIGS. 6A, 6B) riding over a resilient detent finger and pressing it down. After a certain degree of extension, the pin has reached the end of the entry passage and passes over the detent finger which springs back to its raised position so that the pin cannot return along the entry passage (FIGS. 7A, 7B). The actuator is extended further, to its fully extended position. Pressure is then removed from the piston rod (FIGS. 8A, 8B). Removal of the pressure causes the piston rod to retract under the weight of the attached door. The pin then engages and pushes against a sloping guide surface at the end of the entry passageway (FIGS. 9A, 9B) which causes the collar lock to rotate, and the spring based detent ball travels into a groove, thus guiding the pin along a path, and the actuator retracts a small distance with the pin following a new path (FIGS. 10A, 10B). The pin follows this path (FIGS. 11A, 11B) into a lock pocket (FIGS. 12A, 12B) where it remains, holding the actuator, and thus the door, in a locked open position.

Figure 14B:
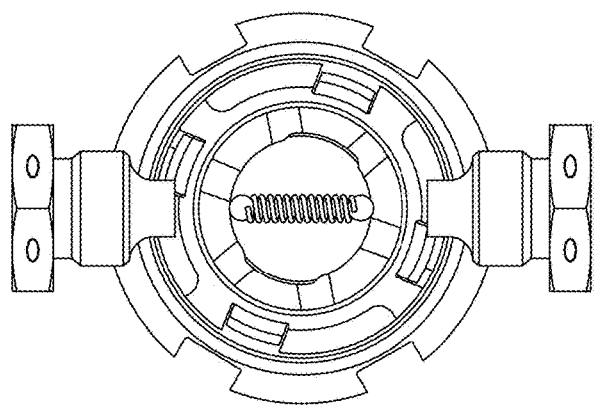
FIGS. 14a and 14b show how the various components move relative to each other during a known locking and unlocking procedure.
Figure 14A:
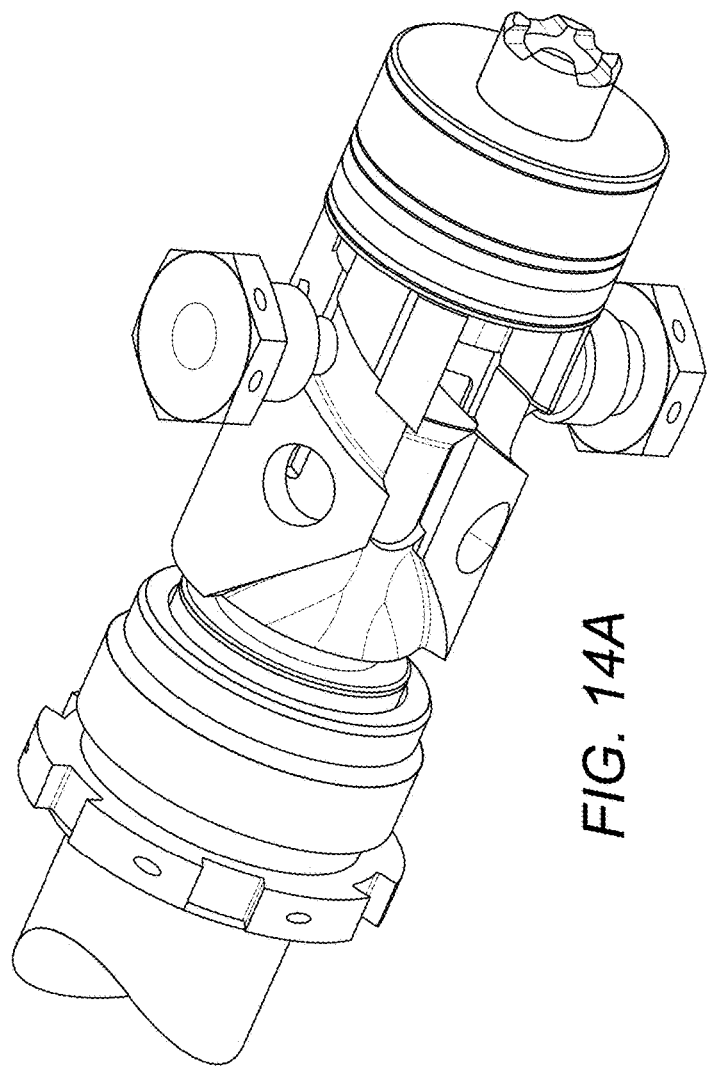

To close the door, pressure is again applied to the piston to extend it sufficient to move back out of the lock recess (FIGS. 13A, 13B) and to abut another sloping guide surface (FIGS. 14A, 14B). The actuator is then fully extended (FIGS. 15A, 15B) after which pressure is then removed causing the actuator to try to retract (FIGS. 16A, 16B) which causes the pin to engage and press against the sloping guide surface which causes further rotation of the collar lock. The pin is guided into an exit passage (FIGS. 17A, 17B) and is able to leave the collar via the exit passage due to the weight of the door causing retraction of the actuator.

Resilient detent means are provided in the passages. As the pin runs over these, it presses them down. Once the pin has passed over the detent means, in some embodiments, the detent means springs pack up preventing return of the pin and also preferably providing a sloped guide surface.

As mentioned above, problems can arise if the actuator is not extended enough for the pin to reach the sloped guide surface to direct it to the next part of the path and into the locking recess. The pins will, however, not pass over the detent means or engage the sloping surfaces to rotate the collar so the actuator will not reach its locked position but it will retract to the stowed position rather than remaining 'almost' locked. The detent means prevent the actuator appearing, falsely, to be locked when the locking procedure has not been completed properly.

The spring biased detent ball also helps to drive the actuator into an end state (locked or stowed) rather than hanging at an intermediate point. The reliability and extent of support from the detent ball is, however, very limited, as mentioned above.

The present disclosure provides an improved mechanism for preventing the pin falling back into the locked position.

With further reference to above figures, as the actuator is extended, the locking pins come into engagement with the locking collar. In the embodiment shown, the surface of the locking collar with which the pins first come into contact is sloped or helical, for reasons described more below, as opposed to having long flat lands.

Otherwise, the locking and unlocking procedure is essentially as described above.

The pins enter the entry passage as the actuator is extended. As the actuator continues to extend, the pin passes over the resilient detent at the end of the entry passage. As the pin passes over the detent, it presses it down. The detent returns to its raised position after the pin has cleared it, preventing the pin returning back down the entry passage.

Once the actuator is fully extended, pressure is removed and the actuator will retract a small distance. It will abut a sloped surface, which may be formed by, or partially formed by the raised detent. The pressure of the pin on the slope will cause rotation of the collar relative to the pin, guiding the pin down towards the lock recesses. The pin then rides into the lock recess and comes to rest in the locked position. As the pin rides into the locked passage, it passes over another resilient detent which rises again after the pin has cleared it to enter the lock recess.

To unlock the actuator, to stow the door, pressure is again applied to the actuator to cause it to expand. The pin is forced out of the lock recess and over the detent, which again rises after the pin has cleared it, to prevent the pin inadvertently returning into the lock recess if the actuator is not sufficiently extended.

The actuator is then fully extended after which pressure is removed. The actuator then begins to retract under the weight of the attached door. The pin abuts another sloping surface which may be formed, or partially formed, by the detent, causing the collar to rotate. The pin is guided around the collar and into an exit passage below the raised part of a detent. The exit passage is preferably the same passage as the initial entry passage.

The pin then exits the collar through the exit passage to fully retract the actuator and stow the door.

As mentioned above, the spring biased detent ball mechanism in existing systems helps, to some extent, to prevent the locking pin(s) hanging at a null point and appearing to be in a locked position when the actuator is not, in fact, locked.

The spring biased detent ball mechanism can be seen in FIGS. 15B to 17B and comprises a spring which biases two balls at its ends against the inner wall of the lock collar. This inner wall is provided with a profile within which the balls travel as the collar is caused to rotate by the locking pins engaging with the lock collar outer path and passageways.

Figure 15B:
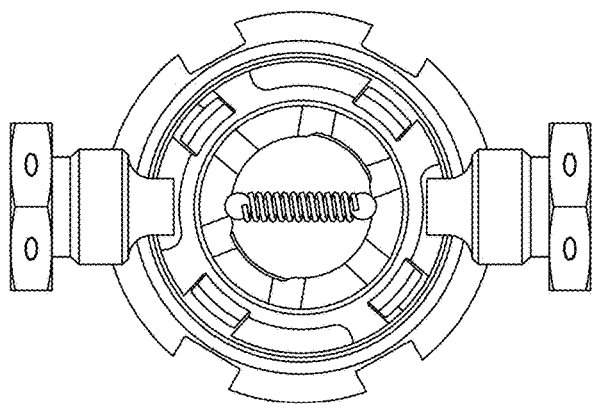
FIGS. 15a and 15b show how the various components move relative to each other during a known locking and unlocking procedure.
Figure 15A:
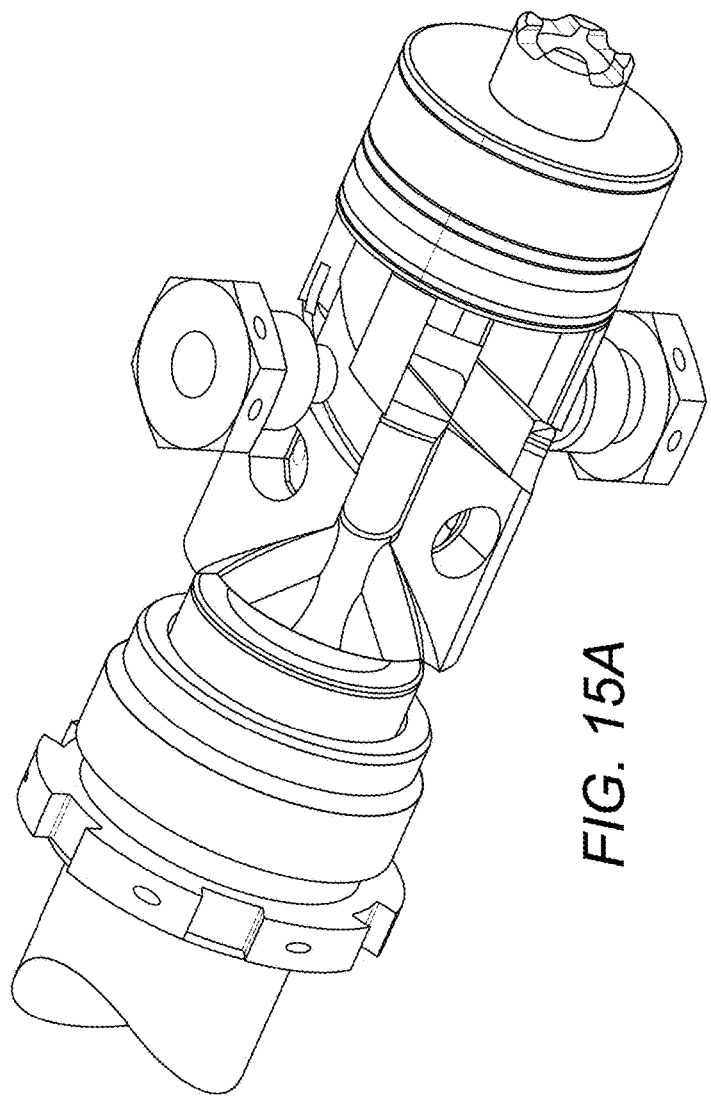
Figure 16B:
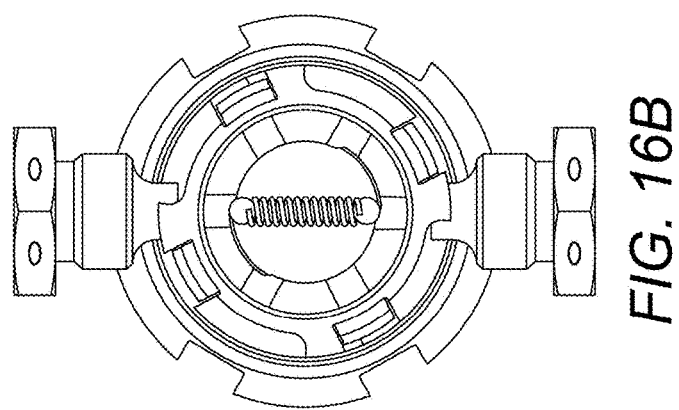
FIGS. 16a and 16b show how the various components move relative to each other during a known locking and unlocking procedure.
Figure 16A:
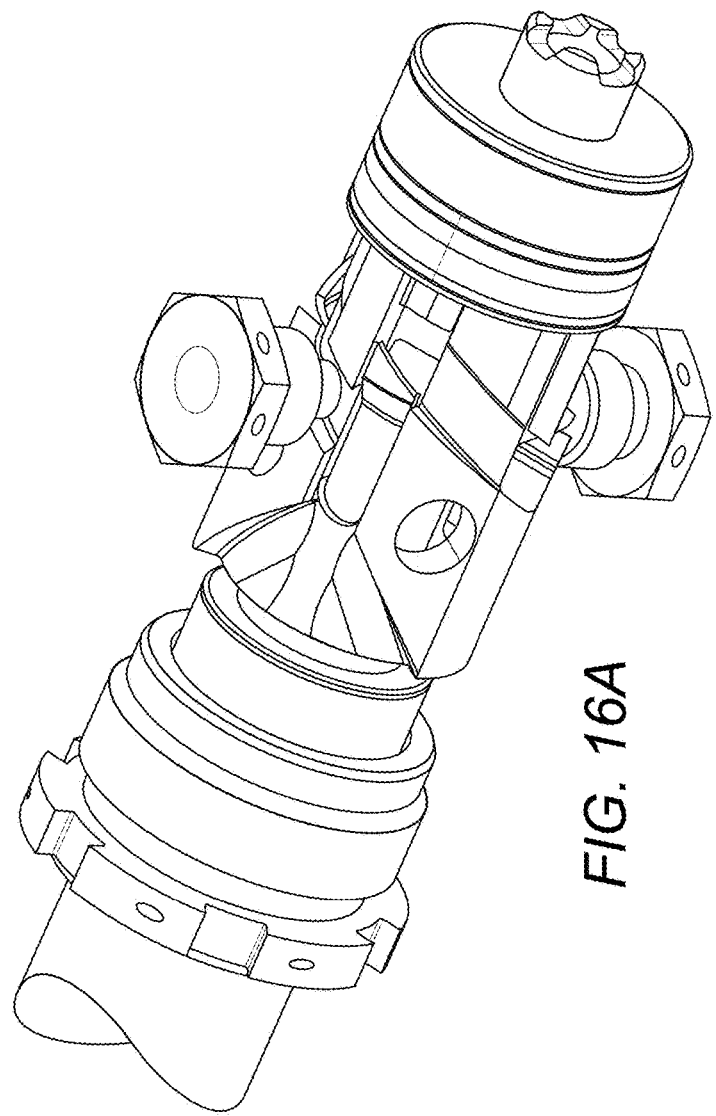
Figure 17B:
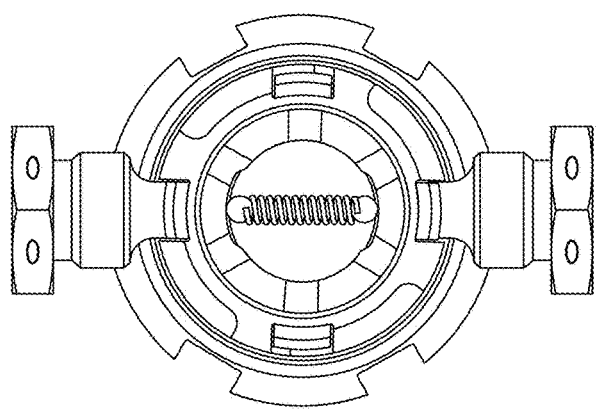
FIGS. 17a and 17b show how the various components move relative to each other during a known locking and unlocking procedure.
Figure 17A:
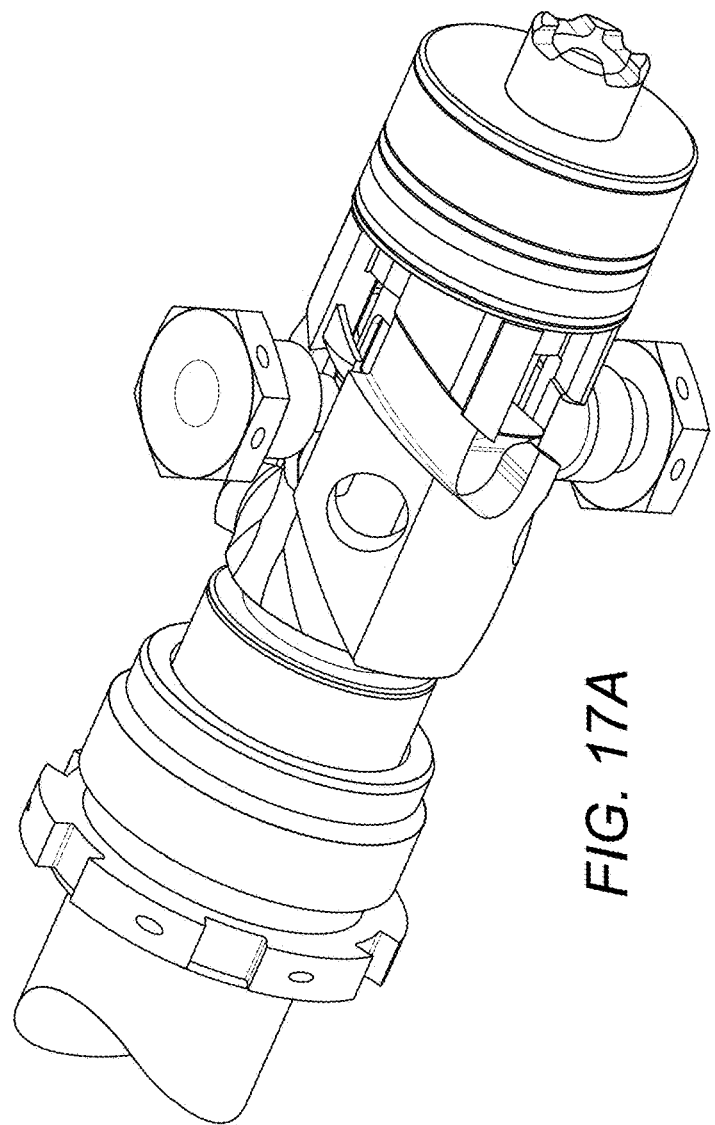

In addition to orienting the outer lock collar profile with respect to the lock pins, the spring biased detent ball mechanism provides an alignment mechanism in the event that the two eye ends (see FIG. 2) have been displaced, angularly, with respect to each other. If this happens, the locking pin will not directly meet the entry passage of the locking collar as the actuator is extended, but will engage with the locking collar slightly to the side of the entrance passage. Provided the angular displacement between the two eye ends is fairly small (not more than around 5 or 6 degrees), the spring biased detent ball will operate to rotate the collar such that the pin is aligned with the entry passage. This works because, as can be seen in FIG. 15B, the torque generated by the detent ball in the groove provided inside the locking collar will quickly index the collar lock back to its locked state.

Problems can, however, arise if the angular deviation between the two eye ends is greater than, say, 5 or 6 degrees. The inner slope over which the detent ball rides, inside the collar lock, cannot be lengthened and, therefore, the detent ball would sit at a position between the slopes and would not cause the automatic indexing provided at smaller angular deviations.

Another feature of an aspect of the present invention provides a solution to this problem and ensures, to a much greater degree, that even with larger angular deviations between the eye ends, up to around 45 degrees, the locking mechanism never hangs at a null point.

The solution to this problem, provided by an aspect of the present disclosure, is to provide a helical or sloping profile on the surface of the locking collar that comes into engagement with the locking pin(s).

With the sloping profile of the locking collar of the disclosure, however, the pin and sloping surface interact to cause rotation of the locking collar relative to the pin until the pin reaches the entry passage and the actuator locking mechanism then operates in a way similar to that described above.

This aspect of the disclosure provides a greatly increased tolerance to angular misalignment between the eye ends, without relying on the spring biased detent ball mechanism. The spring biased detent ball will still be provided to orient the helix profile on the mechanism of the locking collar with respect to the lock pin and retains the locking collar from rotating beyond a certain angle due to vibration, when the actuator is at the stowed state.

This modification will ensure that the pin(s) does not ever meet the locking collar at the flat land (which, in comparison to the prior systems, is small) when extended, but the ball mechanism cannot, as it can in the prior systems, cause a safety issue by falsely indicating that the actuator is locked, due to the ball being positioned at a null point.

In the most preferred system, this outer sloped or helical profile is provided in combination with the spring-biased detent mechanism provided at the end of the locking passage, to avoid false locking or positioning. It is envisaged, however, that advantages could be provided by the sloped profile per se.

The invention claimed is:

1. An actuator system comprising:
an actuator with a rotatable lock mechanism, including:
an actuator pin; and
a lock collar defining a path for an actuator pin as the actuator is expanded and retracted;
wherein the lock collar defines an entry passage through which the actuator pin enters as the actuator extends;
a guide surface along which the actuator pin travels from the entry passage as the actuator retracts;
a locking recess into which the actuator pin is guided by the guide surface; and
an exit passage into which the actuator pin is guided as it is caused to leave the lock recess by extension of the actuator and subsequent retraction;
whereby a detent surface is provided to prevent the actuator pin returning back into the lock recess when the actuator is extended to cause the actuator pin to leave the lock recess;
wherein the lock mechanism further comprises a tine gate fitted within the lock collar and comprising a detent finger defining a detent surface;
wherein when the actuator is extended to cause the actuator pin to leave the locking recess, the detent surface prevents the actuator pin returning back into the lock recess.

2. The system of claim 1, wherein the guide surface and/or the detent surface provide a slope.

3. The system of claim 1, further comprising a detent in the entry passage.

4. The system of claim 1, further comprising a spring biased detent ball arrangement biased across the inner circumference of the collar.

* * * * *